E. COPLESTON.
AUTOMOBILE ALARM.
APPLICATION FILED MAR. 28, 1908.
917,415.
Patented Apr. 6, 1909.
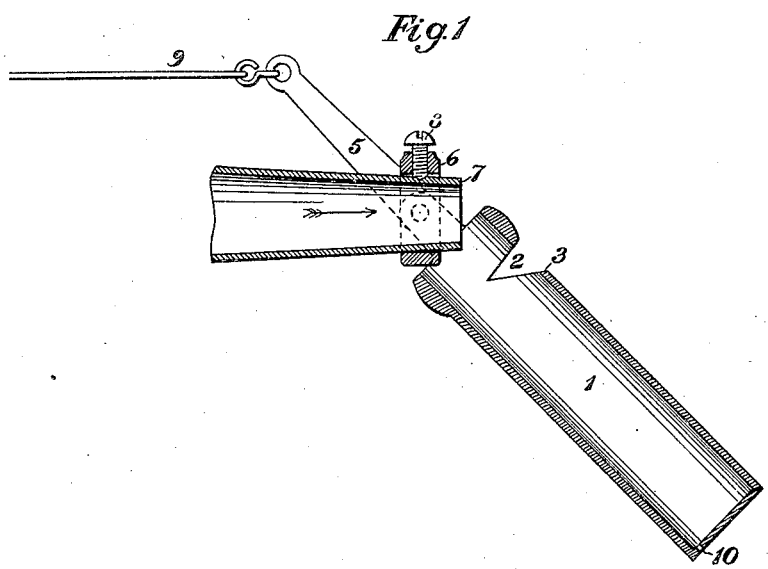
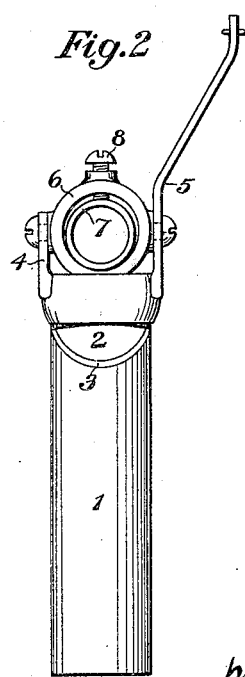

UNITED STATES PATENT OFFICE.

EDWIN COPLESTON, OF BROOKLYN, NEW YORK, ASSIGNOR OF ONE-FOURTH TO LEON COPLESTON AND ONE-FOURTH TO HAROLD COPLESTON, OF ROCKAWAY BEACH, NEW YORK.

AUTOMOBILE-ALARM.

No. 917,415.   Specification of Letters Patent.   Patented April 6, 1909.

Application filed March 28, 1908. Serial No. 423,811.

*To all whom it may concern:*

Be it known that I, EDWIN COPLESTON, a citizen of the United States, residing at Brooklyn, in the county of Kings and State of New York, have invented certain new and useful Improvements in Automobile-Alarms, of which the following is a specification.

My invention relates to alarm devices, for use on motor vehicles, of the type in which a pipe or whistle is sounded by means of the exhaust gases from the engine of the vehicle.

The object of the invention is to produce an alarm device which shall be simple and inexpensive in construction, which may be applied to an automobile without in any way altering the exhaust passages and without imposing any appreciable back-pressure on the exhaust, and which will not become clogged with soot or other solid matter.

To the above ends the invention consists in the automobile alarm hereinafter described, as defined in the following claims.

In the drawings, Figure 1 is a vertical section of a device embodying the invention, showing the whistle in operative position, and Fig. 2 is a rear elevation, showing the whistle in inoperative position.

The illustrated embodiment of the invention comprises a musical pipe or whistle in the form of a tube 1 which is closed at its lower end and open at its upper end. Near the upper end is a vent 2 terminating in a lip 3 over which the exhaust gases pass in sounding the whistle. Arms 4 and 5 on the upper end of the whistle are pivoted upon a collar 6 which is adjustably secured, by means of a set-screw 8, upon the exhaust outlet 7 of the automobile motor. Arm 5 is extended upward and connected with a wire 9 which extends to any point where it may be conveniently reached by the operator of the vehicle.

The whistle hangs normally in vertical position below the exhaust outlet, as shown in Fig. 2, being, in this position, entirely clear of the current of exhaust gases flowing from the outlet. To sound the whistle the operator pulls the wire 9, thereby swinging the whistle into an inclined position, as in Fig. 1. In this position the upper end of the tube intercepts a portion of the stream of exhaust gases, which enters the tube and issues, with substantially unimpaired velocity, through the vent and over the lip, thereby sounding the whistle. By raising the whistle, in the manner described, to a greater or less extent, the whistle may be sounded more or less loudly, according to the amount of exhaust intercepted, and the pitch of the note also varies at the same time, being higher in proportion to the amount of exhaust.

When the wire 9 is released by the operator the whistle swings downward into inoperative position by its own weight.

To avoid the collection of water in the whistle a small outlet 10 is bored in the bottom of the tube.

Although the whistle intercepts a portion of the exhaust, it does not oppose any appreciable resistance to the flow thereof, but the exhaust is merely deflected somewhat from its normal path, and the whistle depends for its operation on the velocity rather than on the pressure of the exhaust. This manner of supplying the whistle with exhaust gas not only obviates the necessity of making any branch connection on the exhaust pipe, but it also does away entirely with the valve usually employed with alarms sounded by the exhaust, so that the construction of the device is substantially simplified.

In musical pipes or whistles of the type which I employ it is usually necessary to provide a passage terminating in a narrow orifice through which the gas or air is directed against the lip of the whistle. This construction is disadvantageous in an alarm sounded by exhaust gases, as the passage and the slit tend to become clogged by soot and other solid matter in the exhaust. In my whistle I do not use such a passage and orifice, but leave the mouth of the whistle wide open, as I have discovered that where the exhaust impinges with considerable velocity against the inner surface of the tube at an angle thereto, as in my whistle, it flows along this surface and issues from the vent in very much the same manner as if confined in a narrow passage, and sounds the whistle with equal effect. I thus avoid all possibility of clogging the exhaust inlet of the whistle, and also substantially simplify the construction.

Various modifications may be made in the embodiment of my invention herein described and illustrated in the accompanying drawings, within the nature and scope of the invention as it is defined in the following claims.

I claim:

1. An alarm device having, in combination with the exhaust outlet of an engine, a whistle having an opening to receive the exhaust, and means for holding the whistle in position to intercept and be sounded by a portion of the stream of exhaust flowing from the outlet without substantially obstructing the flow from the outlet.

2. An alarm device having, in combination with the exhaust outlet of an engine, a whistle having an opening to receive the exhaust, and means for moving the whistle into or out of position to intercept and be sounded by a portion of the stream of exhaust flowing from the outlet, without substantially obstructing the flow from the outlet.

3. An alarm device having, in combination with the exhaust outlet of an engine, a whistle comprising an open-ended tube with a vent and a lip near the open end, and means for holding the whistle in position to cause a portion of the exhaust to impinge at an angle against the inner surface of the tube on the side upon which the vent and the lip are located.

4. An alarm device having, in combination with the exhaust outlet of an engine, a whistle pivotally mounted near the outlet and having an opening adjacent thereto to receive the exhaust, and manually-operable means for swinging the whistle into position to cause it to intercept and be sounded by a portion of the stream of exhaust after its escape from the outlet, without substantially obstructing the flow from the outlet.

5. An alarm device having, in combination with the exhaust outlet of an engine, a whistle comprising a tube with an open end, and means for holding the tube in inclined position with its open end intercepting a portion of the stream of exhaust after its emission from the outlet, so as to sound the whistle without constricting the outlet.

6. An alarm device having, in combination with the exhaust outlet of an engine, a whistle having an opening to receive the exhaust, and means for moving the whistle into and out of a position in which it is out of contact with the exhaust outlet while its inlet opening intercepts a portion of the stream of exhaust after its emission from the exhaust outlet.

In testimony whereof, I affix my signature in presence of two witnesses.

EDWIN COPLESTON.

Witnesses:
ERWIN L. SCHNOR,
GEO. A. RILEY.